United States Patent
Gershon et al.

(10) Patent No.: US 12,229,639 B2
(45) Date of Patent: Feb. 18, 2025

(54) ACCEPTANCE STATUS CLASSIFICATION OF PRODUCT-RELATED DATA STRUCTURES USING MODELS WITH MULTIPLE TRAINING PERIODS

(71) Applicant: EMC IP Holding Company LLC, Hopkinton, MA (US)

(72) Inventors: Noga Gershon, Dimona (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 873 days.

(21) Appl. No.: 17/078,675

(22) Filed: Oct. 23, 2020

(65) Prior Publication Data

US 2022/0129783 A1    Apr. 28, 2022

(51) Int. Cl.
  *G06N 20/00*   (2019.01)
  *G06F 18/213*  (2023.01)
  *G06F 18/214*  (2023.01)

(52) U.S. Cl.
  CPC ........... *G06N 20/00* (2019.01); *G06F 18/213* (2023.01); *G06F 18/2148* (2023.01)

(58) Field of Classification Search
  CPC ............. G06Q 30/0185; G06Q 10/087; G06Q 10/06395; G06Q 10/10; G06Q 30/0202;
  (Continued)

(56) References Cited

U.S. PATENT DOCUMENTS

| 7,499,871 B1 | 3/2009 | McBrayer et al. |
| 9,652,776 B2 * | 5/2017 | Olsen ............. G06Q 30/02 |

(Continued)

FOREIGN PATENT DOCUMENTS

| CA | 2923758 C * | 8/2022 | ......... C12N 15/1058 |
| CN | 107742193 A * | 2/2018 | ......... G06Q 10/0635 |

(Continued)

OTHER PUBLICATIONS https://www.reviewshake.com/enterprise, downloaded on Apr. 13, 2020.

(Continued)

*Primary Examiner* — Steven P Sax
(74) *Attorney, Agent, or Firm* — Ryan, Mason & Lewis, LLP

(57) ABSTRACT

Techniques are provided for acceptance status classification of product-related data structures using models with multiple training periods. One method comprises obtaining data for a given product-related data structure; evaluating first features related to the given product-related data structure using the obtained data; applying the first features related to the given product-related data structure to one or more models trained using multiple different training periods to obtain a plurality of second features, wherein each of the second features indicates a prediction related to an acceptance status of the given product-related data structure by at least one model for a respective training period; and aggregating at least the second features to obtain a classification related to an aggregate acceptance status of the given product-related data structure. A weighting of at least some of the first and second features can be learned during a training phase.

20 Claims, 12 Drawing Sheets

(58) Field of Classification Search
CPC ........ G06Q 30/018; G06N 20/00; G06N 5/04; G06N 5/01; G06N 20/20; G06N 7/01; G06F 18/214; G06F 18/241; G06F 18/2148; G06F 18/213

See application file for complete search history.

(56) References Cited

U.S. PATENT DOCUMENTS

| | | | |
|---|---|---|---|
| 9,679,305 | B1 | 6/2017 | Bhat |
| 10,346,885 | B1 | 7/2019 | Shariff |
| 10,438,229 | B1 | 10/2019 | Viswanath et al. |
| 10,783,992 | B1 * | 9/2020 | Day .................... G06F 3/04847 |
| 10,861,069 | B2 | 12/2020 | Hutchinson |
| 11,080,336 | B2 * | 8/2021 | Van Dusen .......... G06Q 50/184 |
| 11,151,532 | B2 | 10/2021 | Saini |
| 11,568,286 | B2 * | 1/2023 | Nourian ................ G06N 5/045 |
| 2007/0050289 | A1 | 3/2007 | Zeller |
| 2008/0126264 | A1 | 5/2008 | Tellefsen et al. |
| 2012/0054642 | A1 | 3/2012 | Balsiger |
| 2012/0303408 | A1 | 11/2012 | Eder |
| 2014/0006109 | A1 | 1/2014 | Callioni |
| 2014/0207544 | A1 | 7/2014 | Mavinkurve et al. |
| 2014/0310065 | A1 | 10/2014 | Chowdhary et al. |
| 2015/0142545 | A1 | 5/2015 | Ceribelli et al. |
| 2015/0370311 | A1 * | 12/2015 | Eckert .................... G06F 1/3228 713/323 |
| 2015/0379429 | A1 | 12/2015 | Lee et al. |
| 2016/0148237 | A1 * | 5/2016 | Ifrach .................. G06Q 10/063 705/7.31 |
| 2016/0189188 | A1 | 6/2016 | White |
| 2019/0147532 | A1 | 5/2019 | Singh |
| 2019/0317513 | A1 * | 10/2019 | Zhang .................. G06V 10/776 |
| 2019/0347688 | A1 | 11/2019 | Shariff |
| 2020/0027024 | A1 * | 1/2020 | Aggarwal ............. G16H 40/63 |
| 2020/0065736 | A1 | 2/2020 | Relangi |
| 2020/0134683 | A1 | 4/2020 | Boren |
| 2020/0225945 | A1 * | 7/2020 | Wright ............. G06Q 10/06315 |
| 2021/0049648 | A1 | 2/2021 | Thoman |
| 2021/0088494 | A1 * | 3/2021 | Nagar .................. G01N 31/229 |
| 2021/0326795 | A1 * | 10/2021 | Savir .................. G06Q 30/0185 |
| 2022/0058504 | A1 * | 2/2022 | Malhotra ............... G06N 20/20 |

FOREIGN PATENT DOCUMENTS

| | | | | |
|---|---|---|---|---|
| CN | 110826855 | A * | 2/2020 | ............. G01D 18/00 |
| CN | 111353867 | A * | 6/2020 | ............. G06N 20/00 |
| CN | 111681091 | A * | 9/2020 | ............... G06N 3/08 |
| CN | 111738329 | A * | 10/2020 | ........... G06K 9/6256 |
| CN | 111768214 | A * | 10/2020 | |
| CN | 111861206 | A * | 10/2020 | |
| CN | 111930728 | A * | 11/2020 | ........... G06F 16/215 |
| JP | 2019023824 | A * | 2/2019 | |
| JP | 2022053055 | A * | 4/2022 | |
| KR | 102237654 | B1 * | 4/2021 | |
| WO | WO-2019215713 | A1 * | 11/2019 | |
| WO | WO-2020006827 | A1 * | 1/2020 | ....... G06F 16/90332 |

OTHER PUBLICATIONS https://www.perfectprice.com/, downloaded on Apr. 13, 2020.

http://www.oracle.com/us/mittr-machine-learning-5097368.pdf, downloaded on Apr. 13, 2020.

U.S. Appl. No. 16/849,199, entitled, "Artificial Intelligence Techniques for Predicting Quality Scores for Product Orders", filed Apr. 15, 2020.

Natter, Martin, et al. "Practice prize report-An assortmentwide decision-support system for dynamic pricing and promotion planning in DIY retailing." Marketing Science 26.4 (2007): 576-583 (Year: 2007).

Deutsch, Alin, et al. "Automatic Verification of Data-Centric Business Processes." Proceedings of the 12th international Conference on Database Theory. 2009 (Year: 2009).

Rajan Gupta, Chaitanya Pathak, A Machine Learning Framework for Predicting Purchase by Online Customers based on Dynamic Pricing, Procedia Computer Science, vol. 36, 2014, pp. 599-605 (Year: 2014).

* cited by examiner

| FEATURE | DESCRIPTION |
|---|---|
| ORDER_ID | ORDER IDENTIFIER |
| ORDER_ID_SRC | ORDER CATEGORY |
| ORDER_SIZE | SUM OF REVENUE |
| ORDER_MGN_PERC | ORDER MARGIN PERCENTAGE |
| ORDER_STATUS | ORDER LABEL (APPROVED/DENIED) |

ORDER FEATURES 300

FIG. 3A

ITEM FEATURES 330

| FEATURE | DESCRIPTION |
|---|---|
| BRAND_CATG_DESC | LEVELS OF PRODUCT DATA (LOWEST LEVEL, SECOND LEVEL ...) |
| LOB_DESC | LINE OF BUSINESS |
| BELOW_FLOOR | PRICE BELOW FLOOR FLAG |
| PU_REVN_AS_SLD_DISC_USD | PER UNIT REVENUE AFTER DISCOUNT |
| PU_DISC_PERC | DISCOUNT % |
| PU_MGN_PERC | MARGIN % |
| PU_F/C/R_REVN | PER UNIT FLOOR/COMPENSATION/RECOMMENDED REVENUE |
| SYS_QTY | NUMBER OF UNITS |
| REVN_AS_SLD_DISC_USD | REVENUE FROM ITEM (REVENUE X # ITEMS) |
| REVN_AS_SLD_RL_USD | REVENUE IF LIST PRICE IS CHARGED |
| MGN_AS_SLD_USD | ACTUAL MARGIN |
| F/C/R_REVN | FLOOR/COMPENSATION/RECOMMENDED REVENUE |

FIG. 3B

ACCOUNT FEATURES 360

| FEATURE | DESCRIPTION |
|---|---|
| SUB_ACCT_SLS_BU_LEVEL1_DESC | CLIENT PRODUCTS/ENTERPRISE PRODUCTS |
| SUB_ACCT_SLS_BU_LEVEL2_DESC | COUNTRY + CLIENT PRODUCTS/ENTERPRISE PRODUCTS |
| SUB_ACCT_SLS_BU_LEVEL3_DESC | OTHER SUB-CATEGORIES |
| ORDER_ACCT_ID | IDENTIFIER OF SUBACCOUNT. INFORMATION OF PARENT ACCOUNT (SUCH AS COMPANY ABC ITALY CAN BE A SUB-ACCOUNT OF COMPANY ABC EUROPE |
| YOY_GROWTH | YEAR OVER YEAR GROWTH (E.G., REVENUE AND MARGIN) |

FIG. 3C

TRAIN 400

| ORDER ID | BUYING POWER | YOY GROWTH | ORDER SIZE | ... | ORDER MARGIN PERCENTAGE | MARGIN AS SOLD (USD) | ORDER STATUS |
|---|---|---|---|---|---|---|---|
| 12345 | 1246600 | 38431 | 195046 | | 0.133 | 24510 | 1 |
| 14258 | 4850000 | -5205 | 245103 | | 0.182 | 7514 | 0 |
| 65841 | 331926 | 21589 | 30250 | | -0.01 | -1520 | |
| 32165 | 153500 | 2450 | 41258 | | 0.05 | 9541 | 1 |

NEW FEATURES FROM MULTI-TIME PERIOD ORDER ACCEPTANCE STATUS PREDICTION ENGINE 114 (FIG. 2)

450

| ORDER ID | BUYING POWER | YOY GROWTH | ORDER SIZE | ... | ORDER MARGIN PERCENT | MARGIN AS SOLD (USD) | ORDER STATUS 260-1 | ORDER STATUS 260-2 | ORDER STATUS 260-3 | ORDER STATUS |
|---|---|---|---|---|---|---|---|---|---|---|
| 25678 | 1458700 | 24678 | 210432 | | 0.102 | 10890 | 0 | 1 | 1 | 1 |
| 82789 | 3456000 | 9872 | 123400 | | -0.08 | 1012 | 0 | 0 | 0 | 0 |
| 45321 | 432000 | 25678 | 50200 | | 0.05 | 5020 | 0 | 0 | 1 | 0 |
| 90862 | 140523 | 1204 | 61000 | | -0.112 | -2543 | | | 1 | 1 |

FIG. 4

ACCEPTANCE STATUS CLASSIFICATION OF PRODUCT-RELATED DATA STRUCTURES USING MODELS WITH MULTIPLE TRAINING PERIODS

FIELD

The field relates generally to the information processing techniques, and more particularly, to the processing of one or more data structures related to products.

BACKGROUND

Many large entities employ information processing techniques to review product-related data structures for various business purposes. Machine learning models are often employed, for example, to make predictions and/or classifications based on data in the product-related data structures. The product-related data structures may comprise dynamic data. Thus, a machine learning model may not capture the frequent changes that are present in the data and the performance of the machine learning model may be impaired.

A need exists for improved techniques for processing such product-related data structures using one or more machine learning models.

SUMMARY

In one embodiment, a method comprises obtaining data for a given product-related data structure; evaluating a plurality of first features related to the given product-related data structure using the obtained data; applying the plurality of first features related to the given product-related data structure to one or more models trained using a plurality of different training periods to obtain a plurality of second features, wherein each of the plurality of second features indicates a prediction related to an acceptance status of the given product-related data structure by at least one of the models for a respective training period; and aggregating at least the plurality of second features to obtain a classification related to an aggregate acceptance status of the given product-related data structure.

In at least some embodiments, the acceptance status of the given product-related data structure comprises one or more of an automatically accepted status, an automatically denied status, and an additional review required status.

In one or more embodiments, the aggregating comprises: (i) applying the plurality of second features to a machine learning model; (ii) determining an aggregate acceptance score based on an acceptance score assigned by each of the one or more models trained using the plurality of different training periods; (iii) determining whether a threshold number of the one or more models trained using the plurality of different training periods had a given acceptance status; and/or (iv) determining whether a majority of the one or more models trained using the plurality of different training periods had a given acceptance status.

Other illustrative embodiments include, without limitation, apparatus, systems, methods and computer program products comprising processor-readable storage media.

BRIEF DESCRIPTION OF THE DRAWINGS

FIGS. 3A through 3C are sample tables illustrating a number of exemplary order features, item features, and account features, respectively, according to some embodiments;

FIG. 4 comprises sample tables illustrating a number of exemplary order-related features, and enhanced features from the multi-time period order acceptance status prediction engine of FIG. 1, respectively, according to one or more embodiments;

DETAILED DESCRIPTION

Figure 1:
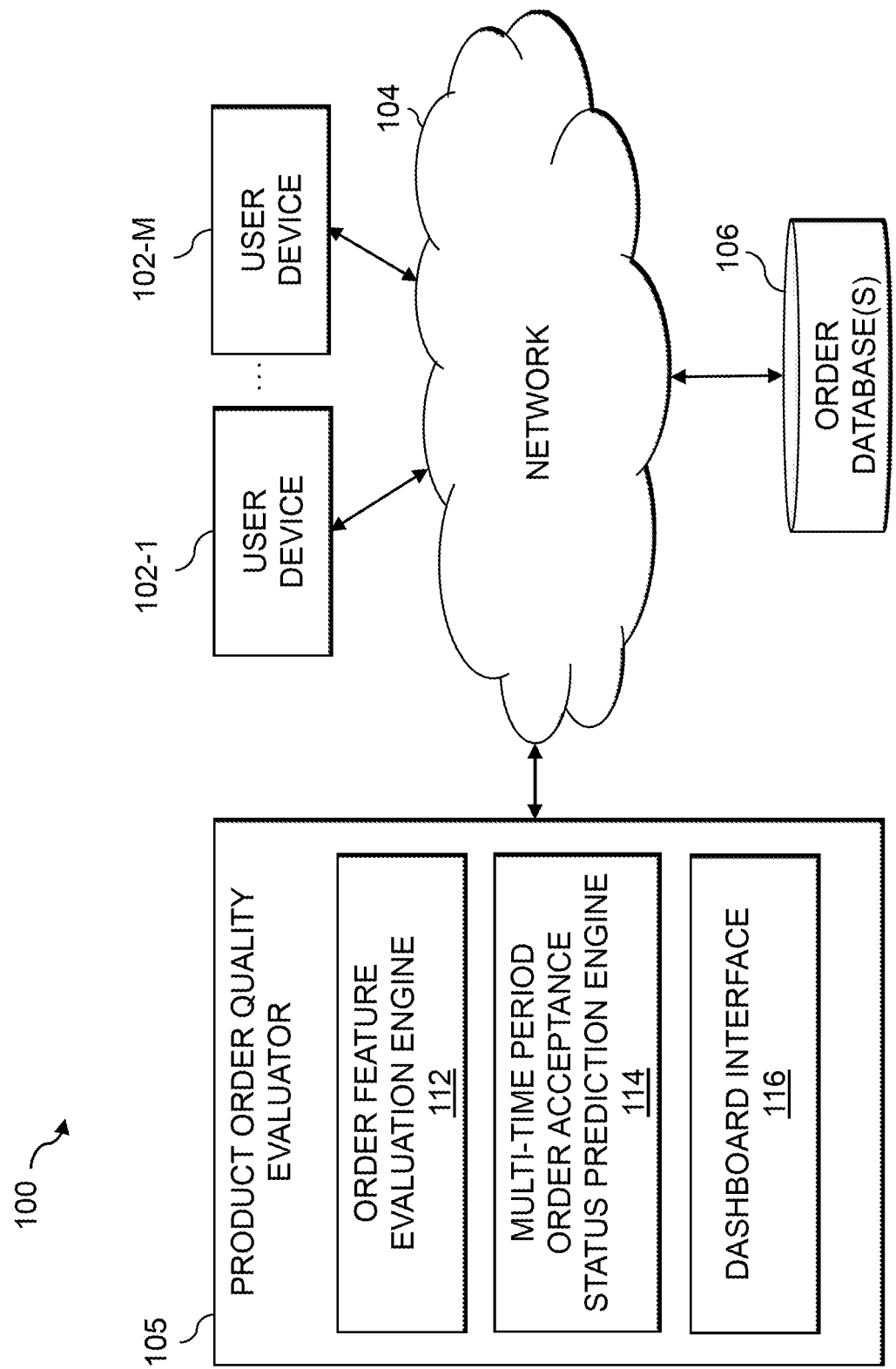
FIG. 1 shows a computer network configured for acceptance status classification of product-related data structures using models with multiple training periods in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for acceptance status classification of product-related data structures using models with multiple training periods. In at least some embodiments, the product-related data structures may be associated with a particular product order or deal.

In one or more embodiments, order acceptance status prediction techniques are provided that can expedite the process of reviewing discounts or other specialized pricing of a given order. In some embodiments, a pricing review in accordance with the disclosed order acceptance status prediction techniques is more efficient and accurate by leveraging artificial intelligence (AI) techniques, such as machine learning and/or statistical methods. As discussed further below, a number of features and/or key performance indicators (KPIs) associated with a given order and/or customer are applied to an AI engine, at least in some embodiments, to determine an acceptance status for the given order. For example, a quality score can be applied to one or more thresholds to automatically approve or deny an order, and/or to prioritize the order for a manual pricing review.

While one or more embodiments are described herein in the context of a product order, the disclosed AI-based techniques may be applied to predict an acceptance status for any product-related data structure associated with one or more products. Thus, a product order is one example of what is more generally referred to herein as a "product-related data structure." Accordingly, the term "product-related data structure," as used herein, is intended to be broadly construed, so as to encompass, for example, any of a wide variety of tables or other arrangements of informational elements, illustratively relating to a product order, as would be apparent to a person of ordinary skill in the art.

A special pricing team may review order quotes, for example, that have at least one item that is priced below a specified floor price. Thus, if a sales representative wants to provide a price quote to the customer having one or more line items with a high discount (e.g., priced below a specified floor price or another violation of a specified pricing threshold), the price quote prepared by the sales representative typically must undergo an audit by the special pricing team. The special pricing team reviews the price quote, and often the business case, and the special pricing team will either approve, deny or modify the price quote for release to the customer.

The review by the special pricing team, however, can waste time and/or money, as there may be numerous quotes in a large enterprise requiring such a review. Thus, the handling time for the quote is increased and the response time may decrease, which may result in losing a given order.

One or more aspects of the disclosure recognize that many large entities employ a special pricing unit to review discounts or other specialized pricing on one or more products in an order that a salesperson would like to offer to a customer. The special pricing unit may consider a number of characteristics of the order, such as the revenue and margins associated with the order and various characteristics associated with the customer, such as a prior purchase history. The pricing review, however, is often a difficult process that may consume a significant amount of time and resources of the special pricing unit. Thus, the pricing review may cause a significant delay before a given order is approved.

One or more aspects of the disclosure also recognize that the decision-making process in the pricing domain can be very dynamic, and that training a model on one specific time period may not capture the constant changes. For example, some deals, based on their characteristics, may require a model trained with a different training period. Thus, one or more embodiments of the disclosure leverage one or more models trained with different time periods to improve the acceptance status classification. For example, a better prediction may be performed for more stable products using a longer training period, while a better prediction may be performed for newer products using a shorter training period.

In some embodiments, the order features and/or key performance indicators associated with an order may comprise one or more features related to characteristics of the account, as well as one or more features related to characteristics of a specific order. These features (and/or KPIs) are processed in accordance with the disclosed order acceptance status prediction techniques to determine whether a given order should be approved or denied (or undergo further review or modification). For example, orders that scored above or below a specified threshold can be automatically approved or automatically denied, respectively, and orders that received inconclusive results will be examined more thoroughly in some embodiments, for example, by the special pricing team.

As noted above, the special pricing process can be a manual and labor-intensive process that may cause significant delays in order approvals. The disclosed artificial intelligence techniques for predicting an acceptance status for a given order for one or more products provide a data-driven solution that provides a data-driven method to review an order based on key categories, such as account, product and order characteristics using machine learning and/or statistical approaches; and an explanatory mechanism that enables the special pricing team experts to explore the impact of characteristics of an order on the generated acceptance status.

FIG. 1 shows a computer network (also referred to herein as a computer network and/or an information processing system) 100 configured in accordance with an illustrative embodiment. The computer network 100 comprises a plurality of user devices 102-1 . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a product order quality evaluator 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective processing devices associated with a particular company, organization or other enterprise or group of users. The user devices 102 may be connected, at least in some embodiments, by an enterprise network. The enterprise network may comprise at least a portion of the computer network 100 of FIG. 1. Numerous other operating scenarios involving a wide variety of different types and arrangements of processing devices and networks are possible, as will be appreciated by those skilled in the art. The user devices 102 may further comprise a network client (not shown in FIG. 1) that can include networking capabilities such as ethernet and/or Wi-Fi.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the exemplary product order quality evaluator 105 can have one or more associated order databases 106 configured to store data pertaining to one or more product orders and related account and product information, etc.

The database(s) 106 in the present embodiment is implemented using one or more storage systems associated with (or a part of and/or local to) the product order quality evaluator 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the product order quality evaluator 105 can be one or more input-output devices, which illustratively comprise keyboards, displays or other types of input-output devices in any combination. Such input-output devices can be used, for example, to support one or more user interfaces to the product order quality evaluator 105, as well as to support communication between the product order quality evaluator 105 and other related systems and devices not explicitly shown.

The user devices 102 and the product order quality evaluator 105 in the FIG. 1 embodiment are assumed to be implemented using at least one processing device. Each such processing device generally comprises at least one processor and an associated memory, and implements one or more functional modules for controlling certain features of the product order quality evaluator 105.

More particularly, user devices 102 and the product order quality evaluator 105, in this embodiment, each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the user devices 102 and product order quality evaluator 105 to communicate over the network 104 with each other (as well as one or more other network devices), and illustratively comprises one or more conventional transceivers.

As also depicted in FIG. 1, the product order quality evaluator 105 further comprises an order feature evaluation engine 112, a multi-time period order acceptance status prediction engine 114, and a dashboard interface 116. The exemplary order feature evaluation engine 112 evaluates a plurality of features, such as the exemplary order features, item features and account features discussed further below in conjunction with FIGS. 3A through 3C. The exemplary multi-time period order acceptance status prediction engine 114 implements the disclosed techniques for determining an acceptance status for a given product order, as discussed further below, for example, in conjunction with FIGS. 2 and 8. In at least some embodiments, the exemplary dashboard interface 116 presents a dashboard indicating acceptance status predictions and enables a user to interact with the presented dashboard. It is to be appreciated that this particular arrangement of modules 112, 114 and 116 illustrated in the product order quality evaluator 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for acceptance status classification of product-related data structures involving user devices 102 of computer network 100 using models with multiple training periods is presented by way of illustrative example only, and in other embodiments additional or alternative elements may be used. Thus, another embodiment includes additional or alternative systems, devices and other network entities, as well as different arrangements of modules and other components.

Exemplary processes utilizing modules 112, 114 and 116 of exemplary product order quality evaluator 105 in computer network 100 will be described in more detail with reference to the flow diagrams of FIGS. 2 and 8.

For additional details regarding one or more aspects of the information processing system 100 of FIG. 1, see, for example, U.S. patent application Ser. No. 16/849,199, filed Apr. 15, 2020, entitled "Artificial Intelligence Techniques for Predicting Quality Scores for Product Orders," incorporated by reference herein in its entirety.

Figure 2:
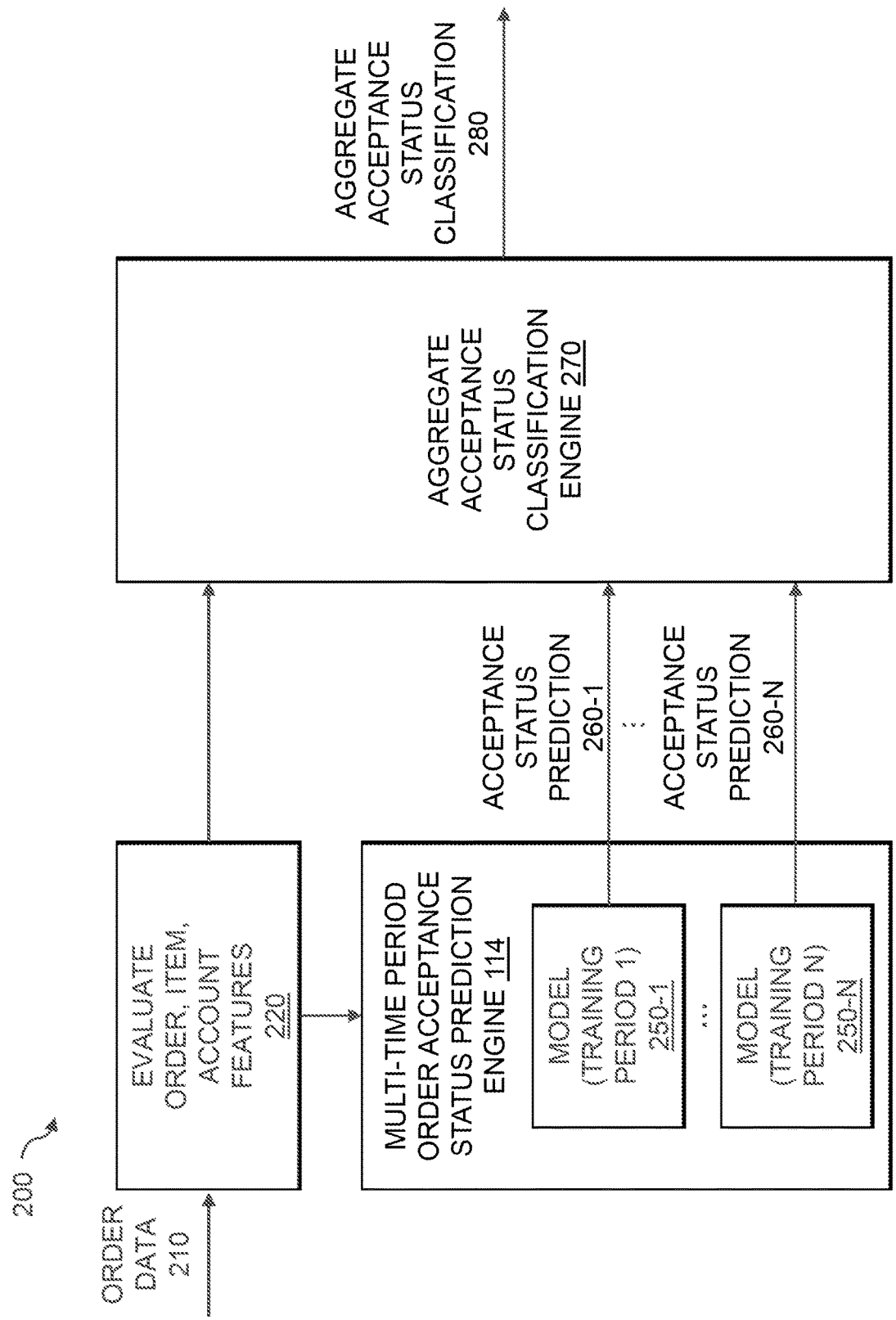
FIG. 2 is a flow chart illustrating an exemplary implementation of an order acceptance status prediction process for an order pricing review, according to one embodiment of the disclosure.

FIG. 2 is a flow chart illustrating an exemplary implementation of an order acceptance status prediction process 200 for an order pricing review, according to one embodiment of the disclosure. As shown in FIG. 2, data 210 associated with an order is applied to a module 220 (e.g., the order feature evaluation engine 112) that evaluates one or more order, item and/or account features, as discussed further below in conjunction with FIGS. 3A through 3B. The evaluated features are then applied to the multi-time period order acceptance status prediction engine 114 that includes one or more models 250-1 through 250-N, each trained using data from a different training period, as discussed further below.

As shown in FIG. 2, the exemplary multi-time period order acceptance status prediction engine 114 generates an acceptance status prediction 260-1 through 260-N from corresponding models 250-1 through 250-N. As noted above, an order quality score can be applied to one or more thresholds to automatically approve or deny the order, and/or to prioritize the order for a manual pricing review.

FIG. 3A is a sample table illustrating a number of exemplary order features 300, according to some embodiments. Generally, as noted above, the exemplary order features 300 are used to assess characteristics of a specific order.

In the example of FIG. 3A, the exemplary order features 300 comprise an order identifier, an order category, a sum of revenue associated with the order, an order margin percentage, and an order label (e.g., approved/denied/further review).

FIG. 3B is a sample table illustrating a number of exemplary item features 330, according to some embodiments. Generally, the exemplary item features 330 are used to assess characteristics of the items (e.g., specific products) in a specific order. In the example of FIG. 3B, the exemplary item features 330 comprise features directed to a levels of product data, a line of business, a price below floor flag, a per unit revenue, a discount percentage, a margin percentage, a per unit floor/compensation/recommended revenue, a number of units, a revenue from item, a revenue if list price is charged, an actual margin, and a floor/compensation/recommended revenue.

For example, the margin percentage can be used to provide a score of per unit margin percentage based on other items in the neighborhood of the current item (which can be limited in some embodiments to specific brands), referred to as neighborhood-based quality scores (also referred as statistical or bucket based). The price below floor may indicate the difference in some embodiments between an actual discount percent and a floor discount percent.

FIG. 3C is a sample table illustrating a number of exemplary account features 360, according to some embodiments. Generally, the exemplary account features 360 are used to assess characteristics of the particular customer account associated with a specific order. In the example of FIG. 3C, the exemplary account features 360 comprise features directed to a client products/enterprise products flag, a country code with the client products/enterprise products flag, other sub-categories, a subaccount identifier and a year-over-year growth.

FIG. 4 comprises a sample table 400 illustrating a number of exemplary order-related features and a sample table 450 illustrating a number of enhanced features from the multi-time period order acceptance status prediction engine 114 of FIG. 1, according to one or more embodiments.

As shown in FIG. 4, the sample table 400 identifies the following features: buying power, year-over-year (YOY) growth, order size, order margin percentage, margin as sold (in US dollars) and an order status for each order, identified by an order identifier.

In addition, the sample table 450 identifies the same features as the table 400, such as buying power, year-over-year (YOY) growth, order size, order margin percentage, margin as sold (in US dollars) and an order status for each order, identified by an order identifier. In addition, the sample table 450 also identifies a number of additional features from the multi-time period order acceptance status prediction engine 114 of FIG. 2, such as order status features 260-1 through 260-N, each comprising an acceptance status prediction 260-1 through 260-N from a corresponding model 250-1 through 250-N. As noted above, one or more of the features from the sample table 450, including the order status features 260-1 through 260-N from the multi-time period order acceptance status prediction engine 114, are applied to the aggregate acceptance status classification engine 270 of FIG. 2 to generate an aggregate acceptance status classification 280.

In this manner, some embodiments of the disclosed techniques for acceptance status classification of product-related data structures using models with multiple training periods employ a two-phase solution, where the model(s) 250 are initially trained on different time periods and the classification 260 for each period is obtained. Thereafter, the classification 260 for each period is used as a feature in the prediction model of the aggregate acceptance status classification engine 270 to increase the coverage (e.g., the recall of the model) as well as the accuracy of the model.

Figure 5:
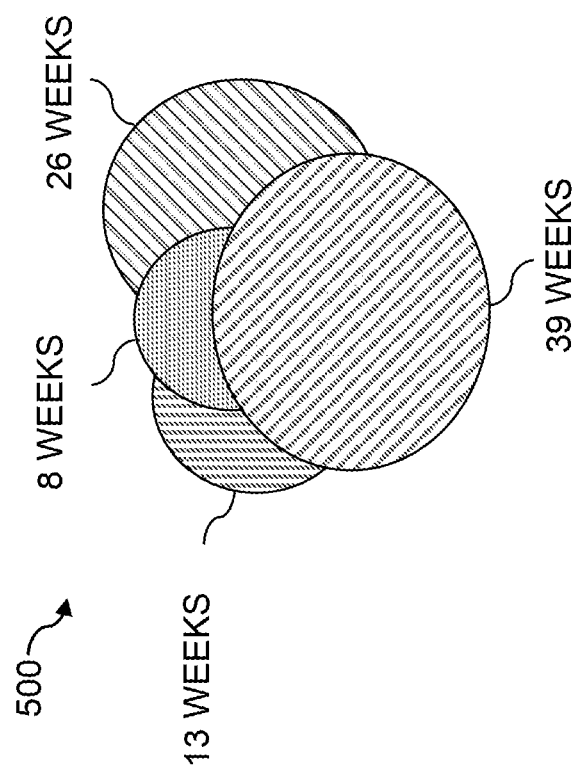
FIG. 5 illustrates an acceptance status classification by one or more models when multiple training periods are used, according to an embodiment of the disclosure.

FIG. 5 illustrates an acceptance status classification 500 by one or more models when multiple training periods are used, according to an embodiment of the disclosure. The acceptance status classification 500 is shown as a Venn diagram with overlapping circles that indicate the classification of different data samples when different training periods, such as training periods of 39, 26, 13 and 8 weeks, are employed. The acceptance status classification 500 of FIG. 5 illustrates how the pricing domain is very dynamic and how models trained with different time periods provide different classification results.

Figure 6:
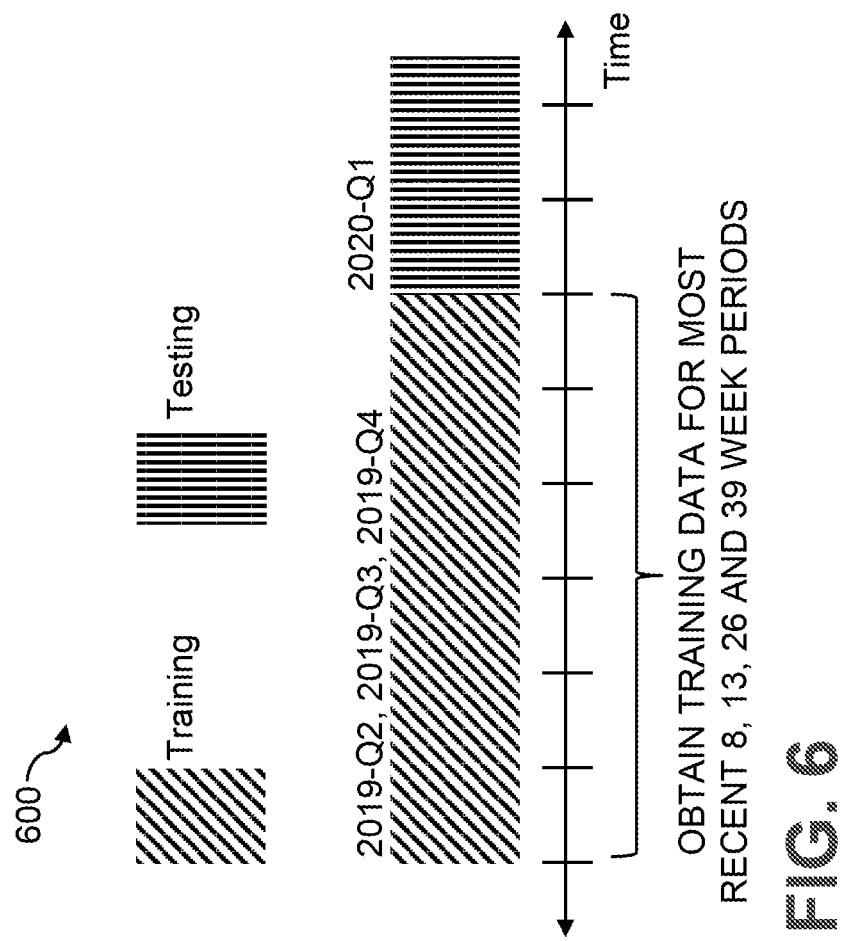
FIGS. 6 and 7 illustrate exemplary training and testing data for order acceptance status prediction, according to some embodiments of the disclosure.

FIG. 6 illustrates exemplary training and testing data 600 for order acceptance status prediction, according to some embodiments of the disclosure. The training and testing data within data 600 are distinguished using a different hash pattern, as shown by the key in FIG. 6. For example, the representative training and testing data comprises one year of enterprise data separated as follows: three exemplary quarters of enterprise data for the training data and one exemplary quarter of the enterprise data for the testing data.

It is noted that in at least some embodiments, for the example of FIG. 6, the multi-period training data used to train the models 250-1 through 250-N, such as training periods of 39, 26, 13 and 8 weeks, from the end of the fourth quarter of 2019 for each training period of 39, 26, 13 and 8 weeks.

Figure 7:
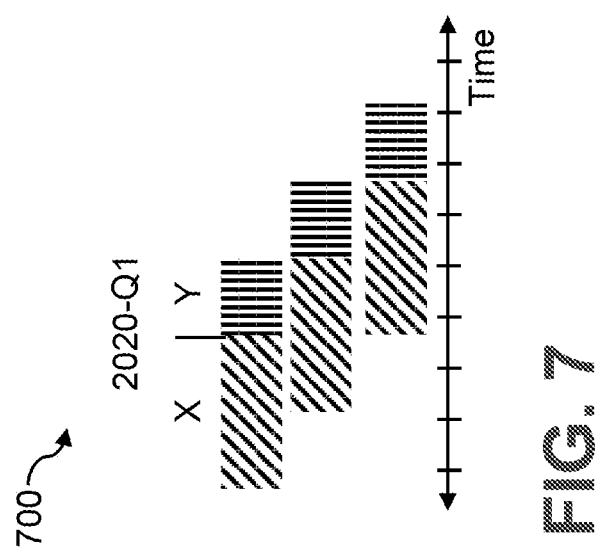

FIG. 7 illustrates exemplary training and testing data 700 for order acceptance status prediction, according to at least some embodiments. In the example of FIG. 7, overlapping sliding window of quarters, for example, are applied to obtain the training and testing data 600 of FIG. 6, such that the sliding window is moved for every quarter (or month or week, for example). The same hash patterns are used in the examples of FIGS. 6 and 7.

Figure 8:
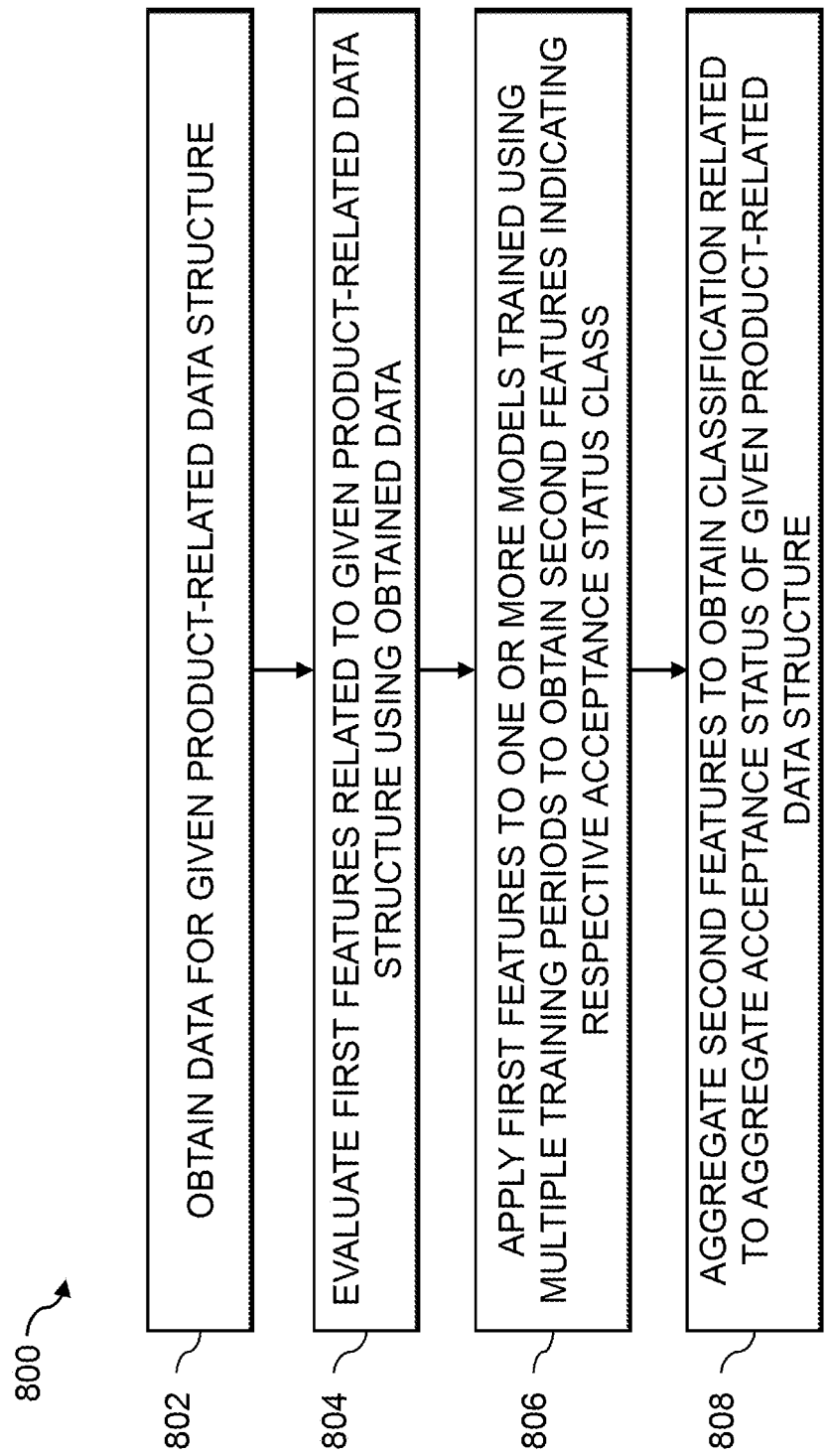
FIG. 8 is a flow chart illustrating an exemplary implementation of an acceptance status classification process, according to one or more embodiments.

FIG. 8 is a flow chart illustrating an exemplary implementation of an acceptance status classification process 800, according to one or more embodiments. As shown in FIG. 8, the exemplary acceptance status classification process 800 initially obtains data for a given product-related data structure during step 802 and evaluates first features related to the given product-related data structure during step 804 using the obtained data.

The evaluated first features are then applied during step 806 to one or more models trained using multiple training periods to obtain a plurality of second features indicating a respective acceptance status class. The second features are then aggregated during step 808 to obtain a classification related to an aggregate acceptance status of the given product-related data structure.

With conventional pricing review techniques, the process is manual and orders may be complex. Thus, different reviewers may make different decisions. Further, since large orders are comprised of multiple product items, each item typically has its own margin, floor price, and other attributes as well as each customer having its own attributes and context. Thus, there is a high complexity involved when making a review decision.

Among other benefits, the disclosed order acceptance status prediction techniques provide automated approvals and denials for orders, and can prioritize additional orders that are not automatically disposed of for further review. In this manner, the volume of orders that need to be reviewed manually is reduced and reviewers can focus their attention on the highest priority orders. Reducing the volume of orders requiring a manual review can also decrease the response time.

Currently, a pricing review (e.g., approving or declining an order) is based solely on the intuition of the member of the pricing review team assigned to the order. Thus, there can be a significant variation between decisions made by different team members. The disclosed order acceptance status prediction techniques, on the other hand, can reduce the variation (and possible bias) and create a standard that every team member can follow.

In one or more embodiments, the disclosed order acceptance status prediction pipeline leverages multiple data sources, multiple time periods for training data and multiple aspects of an order and provides a final acceptance status classification that can be communicated to the user.

One or more embodiments of the disclosure provide improved methods, apparatus and computer program products for acceptance status classification of product-related data structures using models with multiple training periods. The foregoing applications and associated embodiments should be considered as illustrative only, and numerous other embodiments can be configured using the techniques disclosed herein, in a wide variety of different applications.

It should also be understood that the disclosed order acceptance status prediction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for acceptance status classification of product-related data structures using models with multiple training periods may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based order acceptance status prediction engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based order acceptance status prediction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
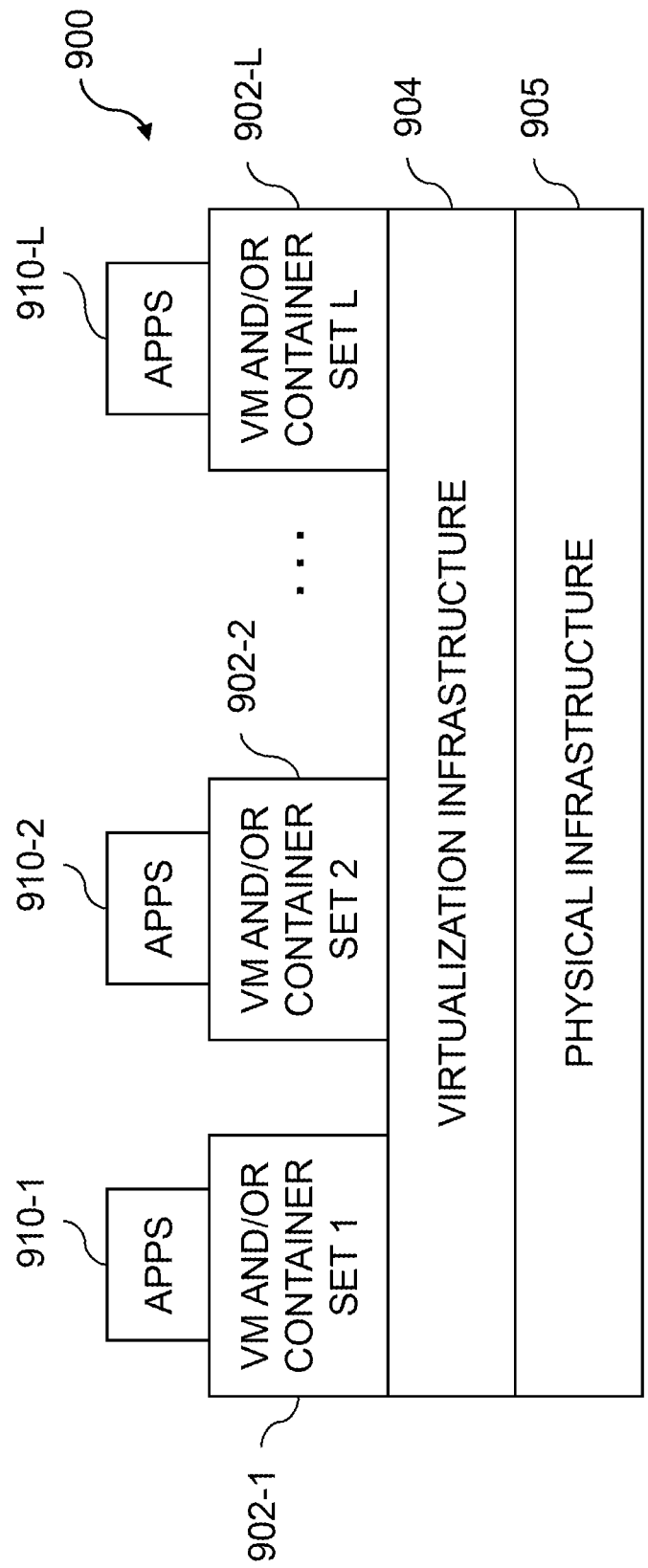
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide order acceptance status prediction functionality of the type described above for one or more processes running on a given one of the VMs. For example, each of the VMs can implement order acceptance status prediction control logic and associated feature tables for providing order acceptance status prediction functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide order acceptance status prediction functionality of the type described above for one or more processes running on different ones of the containers. For example, a container host device supporting multiple containers of one or more container sets can implement one or more instances of order acceptance status prediction control logic and feature tables for use in generating order quality score predictions.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
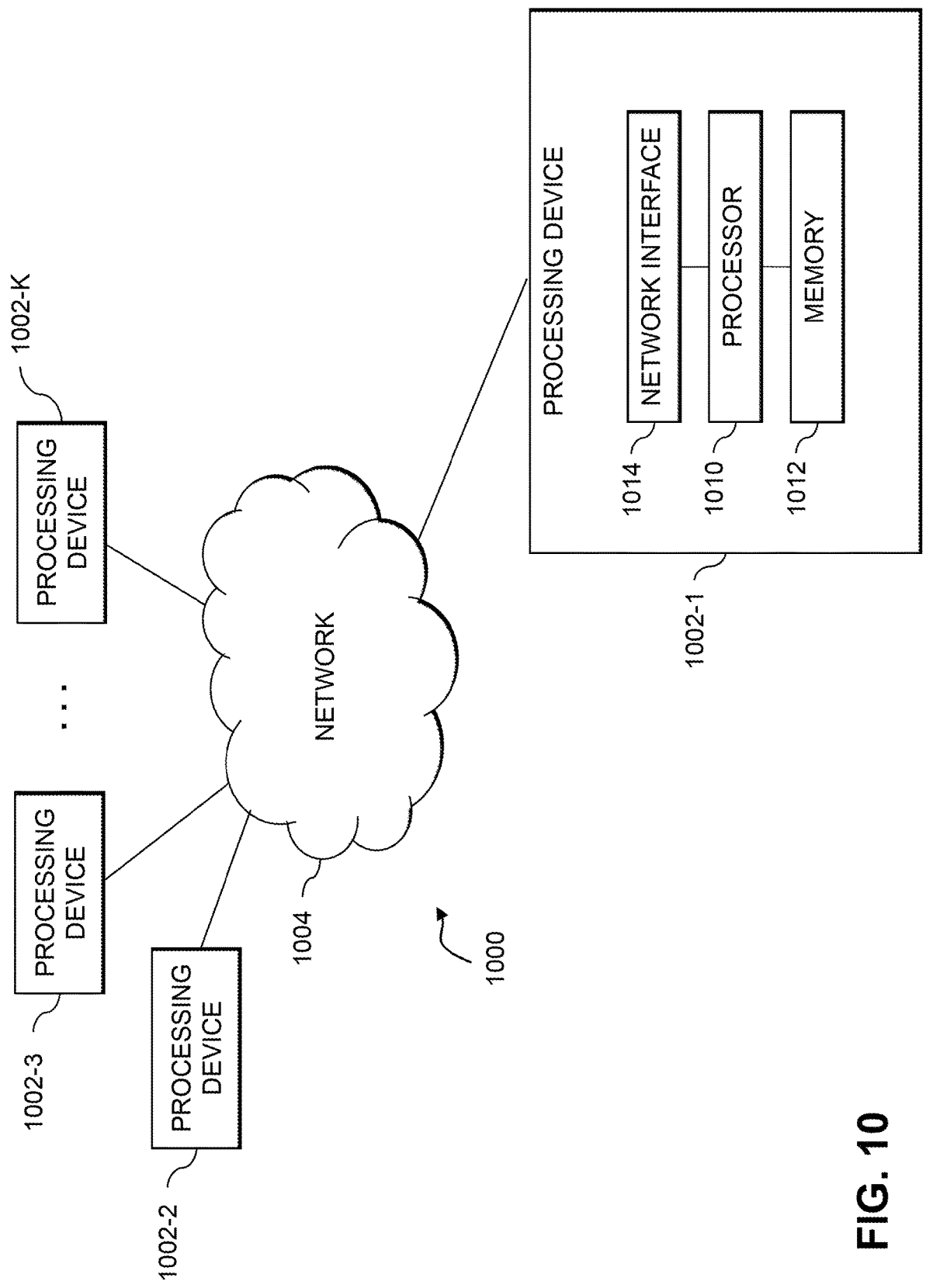
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining data for a given product-related data structure;
   evaluating a plurality of first features related to the given product-related data structure using the obtained data;
   applying the plurality of first features related to the given product-related data structure to a plurality of models to obtain a corresponding plurality of second features, wherein each of the plurality of second features indicates a prediction related to an acceptance status of the given product-related data structure by a respective one of the models for a respective training period, wherein the plurality of models is trained using training data from a respective one of a plurality of different training periods, wherein each different training period comprises a different time duration of the training data, and wherein the plurality of first features is distinct from the respective time duration of the training data for the plurality of models, wherein the plurality of second features comprises respective ones of a plurality of acceptance status predictions, associated with respective ones of the plurality of different training periods, wherein the plurality of acceptance status predictions and one or more of the plurality of first features are applied to a classification engine that generates an aggregate acceptance status; and aggregating at least the plurality of second features to obtain a classification related to the aggregate acceptance status of the given product-related data structure;

wherein the method is performed by at least one processing device comprising a processor coupled to a memory.

2. The method of claim 1, wherein the acceptance status comprises one or more of an automatically accepted status, an automatically denied status and an additional review required status.

3. The method of claim 1, wherein the aggregating comprises one or more of: (i) applying the plurality of second features to a machine learning model; (ii) determining an aggregate acceptance score based on an acceptance score assigned by each of the plurality of models trained using the training data from a respective one of the plurality of different training periods; (iii) determining whether a threshold number of the plurality of models trained using the training data from a respective one of the plurality of different training periods had a given acceptance status; and (iv) determining whether a majority of the plurality of models trained using the training data from a respective one of the plurality of different training periods had a given acceptance status.

4. The method of claim 1, wherein the classification comprises one or more of a binary value, a probability value and a confidence value.

5. The method of claim 1, wherein a training data set for the plurality of models comprises most recent training data for each of the respective ones of the plurality of different training periods.

6. The method of claim 1, wherein a weighting of one or more of the first features and one or more of the second features is learned during a training phase.

7. The method of claim 1, further comprising testing the plurality of models for each of the plurality of different training periods using a testing data set.

8. An apparatus comprising:
at least one processing device comprising a processor coupled to a memory;
the at least one processing device being configured to implement the following steps:
obtaining data for a given product-related data structure;
evaluating a plurality of first features related to the given product-related data structure using the obtained data;
applying the plurality of first features related to the given product-related data structure to a plurality of models to obtain a corresponding plurality of second features, wherein each of the plurality of second features indicates a prediction related to an acceptance status of the given product-related data structure by a respective one of the models for a respective training period, wherein the plurality of models is trained using training data from a respective one of a plurality of different training periods, wherein each different training period comprises a different time duration of the training data, and wherein the plurality of first features is distinct from the respective time duration of the training data for the plurality of models, wherein the plurality of second features comprises respective ones of a plurality of acceptance status predictions, associated with respective ones of the plurality of different training periods, wherein the plurality of acceptance status predictions and one or more of the plurality of first features are applied to a classification engine that generates an aggregate acceptance status; and aggregating at least the plurality of second features to obtain a classification related to the aggregate acceptance status of the given product-related data structure.

9. The apparatus of claim 8, wherein the acceptance status comprises one or more of an automatically accepted status, an automatically denied status and an additional review required status.

10. The apparatus of claim 8, wherein the aggregating comprises one or more of: (i) applying the plurality of second features to a machine learning model; (ii) determining an aggregate acceptance score based on an acceptance score assigned by each of the plurality of models trained using the training data from a respective one of the plurality of different training periods; (iii) determining whether a threshold number of the plurality of models trained using the training data from a respective one of the plurality of different training periods had a given acceptance status; and (iv) determining whether a majority of the plurality of models trained using the training data from a respective one of the plurality of different training periods had a given acceptance status.

11. The apparatus of claim 8, wherein the classification comprises one or more of a binary value, a probability value and a confidence value.

12. The apparatus of claim 8, wherein a training data set for the plurality of models comprises most recent training data for each of the respective ones of the plurality of different training periods.

13. The apparatus of claim 8, wherein a weighting of one or more of the first features and one or more of the second features is learned during a training phase.

14. A non-transitory processor-readable storage medium having stored therein program code of one or more software programs, wherein the program code when executed by at least one processing device causes the at least one processing device to perform the following steps:
obtaining data for a given product-related data structure;
evaluating a plurality of first features related to the given product-related data structure using the obtained data;
applying the plurality of first features related to the given product-related data structure to a plurality of models to obtain a corresponding plurality of second features, wherein each of the plurality of second features indicates a prediction related to an acceptance status of the given product-related data structure by a respective one of the models for a respective training period, wherein the plurality of models is trained using training data from a respective one of a plurality of different training periods, wherein each different training period comprises a different time duration of the training data, and wherein the plurality of first features is distinct from the respective time duration of the training data for the plurality of models, wherein the plurality of second features comprises respective ones of a plurality of acceptance status predictions, associated with respective ones of the plurality of different training periods, wherein the plurality of acceptance status predictions and one or more of the plurality of first features are applied to a classification engine that generates an aggregate acceptance status; and aggregating at least the plurality of second features to obtain a classification related to the aggregate acceptance status of the given product-related data structure.

15. The non-transitory processor-readable storage medium of claim 14, wherein the aggregating comprises one or more of: (i) applying the plurality of second features to a machine learning model; (ii) determining an aggregate acceptance score based on an acceptance score assigned by each of the plurality of models trained using the training data from a respective one of the plurality of different training periods; (iii) determining whether a threshold number of the plurality of models trained using the training data from a respective one of the plurality of different training periods had a given acceptance status; and (iv) determining whether a majority of the plurality of models trained using the training data from a respective one of the plurality of different training periods had a given acceptance status.

16. The non-transitory processor-readable storage medium of claim 14, wherein a training data set for the plurality of models comprises most recent training data for each of the respective ones of the plurality of different training periods.

17. The non-transitory processor-readable storage medium of claim 14, wherein a weighting of one or more of the first features and one or more of the second features is learned during a training phase.

18. The method of claim 1, wherein the plurality of first features related to the given product-related data structure comprises two or more of: at least one order feature, at least one product feature and at least one account feature.

19. The method of claim 1, wherein the classification engine comprises at least one prediction model and wherein the plurality of second features are applied to the at least one prediction model.

20. The apparatus of claim 8, wherein the classification engine comprises at least one prediction model and wherein the plurality of second features are applied to the at least one prediction model.

* * * * *